United States Patent
Mary et al.

[15] 3,654,553
[45] Apr. 4, 1972

[54] REMOTELY SENSING OPTICAL TACHOMETER

[72] Inventors: Donald J. Mary, Hyattsville; Harry J. Davis, Wheaton, both of Md.

[73] Assignee: The United States of America as represented by the Secretary of the Army

[22] Filed: July 1, 1970

[21] Appl. No.: 51,461

[52] U.S. Cl. .............................. 324/175, 73/167, 250/230, 318/313, 350/285, 356/152
[51] Int. Cl. .......................................................... G01p 3/48
[58] Field of Search ..................... 356/28, 29, 141, 152, 138; 250/236, 230; 350/285, 289, 7; 324/175; 318/313; 73/167

[56] References Cited

UNITED STATES PATENTS 3,241,036   3/1966   Edgerton .............................. 250/236

FOREIGN PATENTS OR APPLICATIONS 390,170   3/1933   Great Britain ....................... 250/230
583,812   10/1958   Italy ...................................... 324/175

OTHER PUBLICATIONS

F. B. Porterfield, "Photoelectric Circuit Breaker," IBM Tech. Discl. Bul., 1 (Dec. 1958) p. 8.
"Electronic Tachometer," Electronic Industries, Vol. 4, No. 3, Mar. 1945, pp. 80–81, 208.

Primary Examiner—Ronald L. Wibert
Assistant Examiner—Jeff Rothenberg
Attorney—Harry M. Saragovitz, Edward J. Kelly, Herbert Berl and J. D. Edgerton

[57] ABSTRACT

A remotely sensing optical tachometer for measuring the spin rate of a rotating member. The invention provides a simple optical system for measuring the spin and/or rate of change of spin, of, for example, an artillery shell or test projectile. The system provides a real-time readout of the spin rate, and requires no instrumentation aboard the projectile except for a small plane mirror that is attached obliquely to one end of the spinning projectile. The system directs a collimated beam of light that is reflected off the plane mirror back into the system where it traverses a stationary reticle that has alternating transparent and opaque sectors thereon. The frequency with which the light passes through the transparent portions of the reticle provides a direct indication of the spin rate of the rotating member. The signal may be detected by a photo tube, amplified, and displayed on an oscilloscope, or recorded on magnetic tape, or be processed through a frequency-to-DC converter.

12 Claims, 2 Drawing Figures

Patented April 4, 1972

3,654,553

INVENTORS,
DONALD J. MARY
HARRY J. DAVIS
BY Harry M. Saragovitz
Edward J. Kelly
Herbert Berl
J. D. Edgerton
ATTORNEYS

REMOTELY SENSING OPTICAL TACHOMETER

RIGHTS OF GOVERNMENT

The invention described herein may be manufactured, used, and licensed by or for the Government of the United States for governmental purposes without the payment to us of any royalty thereon.

BACKGROUND OF THE INVENTION

1. Field of the Invention

This invention relates to optical devices, and more particularly, to optical devices that measure the spin rate of a remote rotating projectile.

2. Description of the Prior Art

In one phase of testing fuzes or fuze components for use in artillery shells or other spinning projectiles, knowledge of the spin rate and spin rate of change of the projectile is important. Present techniques for determining the spin rate of such a projectile are photographing the projectile with a high-speed movie camera or telemetering the output of accelerometers mounted in the projectile. The former method requires considerable time to reduce the data and involves expensive photography equipment. The latter method can also be highly expensive in that the telemetry unit may be destroyed when the projectile impacts.

Accordingly, the primary object of the present invention is to provide an optical device that will remotely sense the spin rate and spin rate of change of a rotating projectile in which no instrumentation is required on the projectile.

Another object is to provide an optical tachometer for measuring the spin and rate of change of spin of a test projectile that allows real-time readout of the spin rate.

An additional object of the present invention is to provide a simple optical system which allows a remote measurement of rotation of a spinning member that is inexpensive and simple to construct.

SUMMARY OF THE INVENTION

Briefly, in accordance with the invention, a remotely sensing optical tachometer is provided that allows real-time readout of the spin rate and/or spin rate of change of a rotating projectile that is remote to the measuring system. The tachometer comprises a plane mirror that is mounted obliquely along the spin axis of one end of the rotating member and an optical system for directing and detecting a collimated beam of light onto said mirror. Since the mirror is mounted at an angle to its spin axis, the reflected light properly focused traverses a circular path due to the rotation of the projectile. A stationary reticle having alternating transparent and opaque sectors is placed in the optical path of the reflected beam. The circular path traversed by the reflected beam upon the reticle provides a series of pulses to a photo tube placed behind the reticle. The series of pulses will generate a signal whose frequency will be directly proportional to the spin rate of the projectile. By making the number of sectors in the reticle sufficiently large, the rate of change of spin may be detected over very small time intervals. The output of the photo tube may be amplified and fed to either an oscilloscope or to a frequency-to-DC converter to provide a real-time plot of spin rate versus time.

BRIEF DESCRIPTION OF THE DRAWINGS

The specific nature of the invention as well as other objects, aspects, uses, and advantages thereof will clearly appear from the following description and from the accompanying drawings, in which.

DESCRIPTION OF THE PREFERRED EMBODIMENT

The device of the present invention provides simple optical means for measuring the spin and/or rate of change of spin of a projectile. The method provides real-time readout of the spin rate, and requires no instrumentation aboard the projectile except a small plain mirror. The technique is ideally suited for use with a device such as disclosed in U.S. Pat. No. 3,444,733 to Curchak for an artillery simulator. However, this invention may be used with other types of air or gas guns, spinners, and centrifuges, or wherever the remote measurement of rotation is desired.

Figure 1:
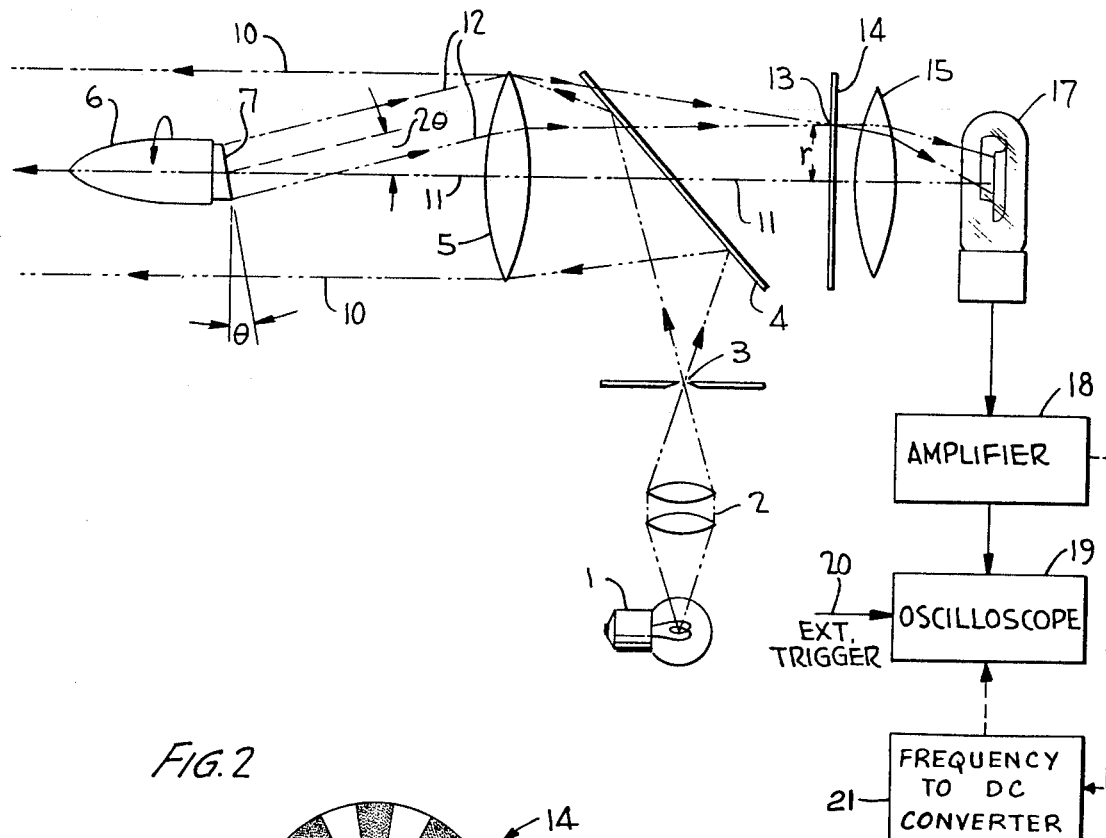
FIG. 1 is a schematic illustration of a preferred embodiment of the optical tachometer of the present invention.

Referring now to FIG. 1, a spinning projectile 6 is shown moving away from the apparatus along its spin axis 11. A tilted plane mirror 7 is mounted on the rear end of projectile 6. A light source 1 is imaged by a pair of condensing lenses 2 onto a pinhole 3. Pinhole 3 is located in the focal plane of a lens 5 that is centered on spin axis 11 of projectile 6. Between lens 5 and pinhole 3 is a beam splitter or half-silvered mirror 4 which directs the light from pinhole 3 to lens 5. Since pinhole 3 is located in the focal plane of lens 5, the light emerges from lens 5 in a collimated beam represented by rays 10. If the surface of mirror 7 mounted upon projectile 6 is tilted at an angle $\theta$ from the normal to spin axis 11, some of the light in beam 10 will be reflected, as represented by reflected beam 12, at an angle $2\theta$. Because reflected beam 12 is also collimated, an image 13 of source 1 will be formed in the focal plane of lens 5. Although some of the light in beam 12 will be reflected down to source 1 by half-silvered mirror 4, a portion will still pass through and be imaged at 13. A stationary reticle 14 is located in the focal plane of lens 5 and the light forming image 13 impinges upon it.

Figure 2:
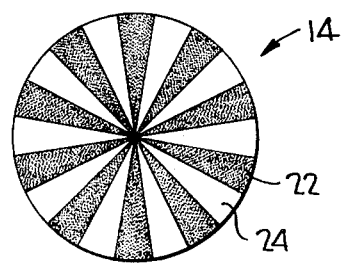
FIG. 2 is a drawing of a reticle which is employed in the preferred embodiment of the invention.

As seen in FIG. 2, reticle 14 consists of a series of alternate transparent 24 and opaque 22 sectors equally spaced around its circumference. If projectile 6 is rotating about axis 11 while in flight, reflected beam 12 will also rotate about spin axis 11. It is evident that image 13 will likewise rotate about reticle 14 in a circle of radius $r$. Behind reticle 14 is a photoelectric tube 17 or some other suitable photosensitive detector. As image 13 rotates about reticle 14, light passes through to phototube 17 each time the image moves over a transparent sector of reticle 14. The light is blocked from phototube 17 when image 13 passes over an opaque sector of reticle 14. Thus, the output of photoelectric tube 17 will be a signal whose frequency is a direct function of the spin rate of projectile 6. The output of phototube 17 is amplified by amplifier 18 and displayed on an oscilloscope 19 where it may be viewed or photographed. Oscilloscope 19 may be triggered from some external source 20 so that only a small portion of the flight path of the projectile is displayed but on a magnified time scale. Additionally, the amplified signal from amplifier 18 may be recorded on magnetic tape, or processed through a frequency-to-DC converter 21. The output of the converter 21 when displayed on an oscilloscope 19 will produce a real-time plot of spin rate versus time. Between reticle 14 and phototube 17 is a field lens 15 which serves to direct the light onto phototube 17 regardless of where on reticle 14 image 13 is formed.

Any collimated source of light may be used to generate beam 10. For example, a small helium-neon gas laser could be utilized. Its use would eliminate the necessity for condensing lenses 2 and pinhole 3. In such an arrangement beam splitter 4 can be reduced in size as it need only be as large as the diameter of the laser beam. In instances where projectile 6 is fired from a gun which is closed at the rear end by a breach or some other assembly, head on measurement of the spin is possible by using a plane mirror mounted on the front of the projectile.

We wish it to be understood that we do not desire to be limited to the exact details of construction shown and described for obvious modifications will occur to a person skilled in the art.

We claim as our invention:

1. An optical tachometer for measuring the spin rate of a rotating member along its trajectory comprising:

a. a rotating member having a spin axis oriented substantially along its trajectory;

b. a reflecting surface mounted obliquely with respect to said spin axis on said rotating member;

c. means for directing a beam of light towards said reflecting surface, said beam being reflected from said reflecting surface, said reflected beam rotating in space by virtue of the spin associated with said rotating member;

d. means remotely located from said rotating member for receiving said rotating and reflected beam of light; and e. means for measuring the rate of rotation of said reflected beam of light as said rotating member travels along said trajectory and as the forward motion of said rotating member ceases whereby the spin rate of said rotating member may be readily ascertained at any point along said trajectory.

2. The invention according to claim 1 wherein said measuring means comprises:

a. a reticle having a plurality of alternating transparent and opaque sectors whereon said reflected beam of light traverses a predefined path; and b. means located behind said reticle for detecting the pulses of said reflected beam of light allowed therethrough and for producing an output signal whose frequency is proportional to the spin rate of said rotating member.

3. The invention according to claim 2 wherein said means for directing a beam of light towards said reflecting surface comprises:

a. a source of light;

b. condensing lenses for receiving the light from said source;

c. means for providing a pinhole for receiving the light from said condensing lenses and transmitting a portion therefrom; and d. means located along said spin axis of said rotating member for reflecting said portion of light from said means for providing a pinhole towards said rotating member.

4. The invention according to claim 3 wherein said receiving means comprises a lens centered on said spin axis of said rotating member.

5. The invention according to claim 4 wherein said reticle is located in the focal plane of said lens and perpendicular to said spin axis and wherein said transparent and opaque sectors are radially disposed thereupon.

6. The invention according to claim 5 wherein said reticle is stationary relative to said rotating member.

7. The invention according to claim 6 wherein said reflecting means comprises a beam splitter.

8. The invention according to claim 6 wherein said reflecting means comprises a half-silvered mirror.

9. The invention according to claim 2 wherein said detecting means comprises a photosensitive device that produces said output signal, further comprising an amplifier and means for displaying the amplified signal therefrom.

10. The invention according to claim 9 further comprising a frequency-to-DC converter that receives said amplified signal and produces a real-time plot of said spin rate versus time.

11. The invention according to claim 9 further comprising a field lens located between said reticle and said photosensitive device for directing said reflected light onto said photosensitive device regardless of its location upon said reticle.

12. The invention according to claim 11 wherein said reflecting surface comprises a plane mirror.

* * * * *